UNITED STATES PATENT OFFICE.

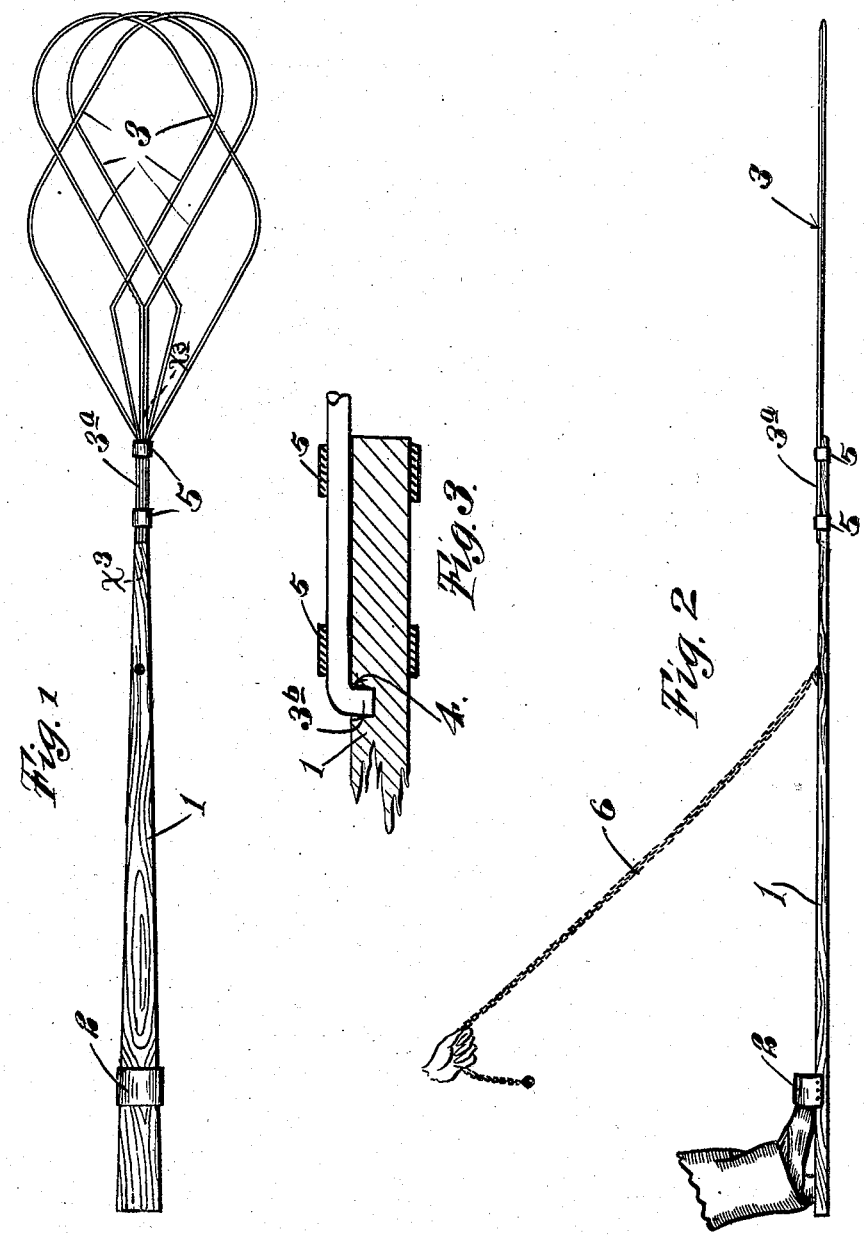

EDWARD G. OSZMAN, OF MINNEAPOLIS, MINNESOTA.

CARPET-BEATER.

No. 919,754.    Specification of Letters Patent.    Patented April 27, 1909.

Application filed January 2, 1909. Serial No. 470,358.

*To all whom it may concern:*

Be it known that I, EDWARD G. OSZMAN, a citizen of the United States, residing at Minneapolis, in the county of Hennepin and State of Minnesota, have invented certain new and useful Improvements in Carpet-Beaters; and I do hereby declare the following to be a full, clear, and exact description of the invention, such as will enable others skilled in the art to which it appertains to make and use the same.

My invention has for its object to provide an improved device for beating carpets and rugs.

To this end, the invention consists of the novel devices and combinations of devices hereinafter described and defined in the claims.

Hitherto, so far as I am aware, carpet and rug beaters have been so designed that they were necessarily held in the hand when used. My invention provides a carpet or rug beater which may be operated by the combined action of one foot and one hand, the foot being used to impart the operative stroke to the beater and the hand being used simply to raise or to assist in raising the beater for another stroke.

This improved beater, in its preferred form, is illustrated in the accompanying drawings wherein like characters indicate like parts throughout the several views.

Referring to the drawings: Figure 1 is a plan view of the improved beater; Fig. 2 is a side elevation of the same; and Fig. 3 is an enlarged detail in vertical section taken on the line $x^3$ $x^3$ of Fig. 1.

The numeral 1 indicates a so-called foot bar, preferably constructed of wood and provided with a tapered free end, and near its other end with a stirrup or toe strap 2. The foot bar 1, at its free end, is provided with a suitable beater preferably made up of a multiplicity of quite heavy spring wires 3 that are bent to form overlapping loops, and with their ends brought together at $3^a$ and terminated in downwardly bent ends $3^b$. These bent ends $3^b$ are seated in a transverse groove or notch 4 formed in the reduced end portion of the foot bar 1, and their closely assembled stem portions $3^a$ are clamped to the said bar by a pair of approximately rectangular hoops or bands 5. The said bands 5, when driven onto the tapered end portion of the bar 1, are very securely held by friction, and they serve to very tightly draw the stem portions $3^a$ of the wire loops 3 onto the said bar. The engagement of the ends $3^b$ with the notch 4 serves to positively hold the wire loops so that they cannot work loose by axial movement. To the intermediate portion of the bar 1, a connection, preferably in the form of a tight chain 6 is attached.

When the device is to be used, the bar 1 is placed on the floor or on the ground, one foot is placed on the rear end of said bar with the toe inserted into the stirrup or strap 2, and the free end of the chain or lifting connection 6 is gripped in one hand. The beater, made up of the loop wires 3, is raised by pulling on the chain 6 so as to raise the bar 1 with its base end resting on the ground or floor; and the operative or beating stroke is imparted to the device by pressing the foot upon the bar 1, and at the same time giving slack to the chain 6.

It will, of course, be understood, that the beater at the free end of the so-called foot bar, may take various forms.

What I claim is:

1. A device of the kind described, comprising a foot bar having a beater at one end, and provided with a lifting connection having a loose free end adapted to be held in the hand, whereby the said device may be operated by one foot and one hand.

2. A device of the kind described, comprising a foot bar having a beater at one end and a stirrup or toe strap near its other end, and provided with a flexible lifting connection attached to its intermediate portion, whereby the said device may be operated by one foot and one hand.

3. In a device of the kind described, the combination with a foot bar having a tapered free end, and provided near its other end with a stirrup or toe strap, a flexible lifting connection attached at one end to the intermediate portion of said bar, a beater made up of a multiplicity of looped wires having closely assembled stems applied to the tapered end of said bar and formed with bent ends engaging a notch in said bar, and metallic hoops driven onto the tapered end of said bar and rigidly securing the assembled stems of said wires to said bar.

In testimony whereof I affix my signature in presence of two witnesses.

EDWARD G. OSZMAN.

Witnesses:
H. D. KILGORE,
ALICE J. SWANSON.